(12) United States Patent
Lin et al.

(10) Patent No.: US 9,151,341 B2
(45) Date of Patent: Oct. 6, 2015

(54) SPEED CHANGING CONTROL METHOD AND SPEED CHANGING MECHANISM THEREOF

(75) Inventors: Zhongwei Lin, Nanjing (CN); Yanhua Shen, Nanjing (CN)

(73) Assignee: Nanjing Afu Automobile Control System Co., Ltd., Nanjing, Jiangsu (CN)

( * ) Notice: Subject to any disclaimer, the term of this patent is extended or adjusted under 35 U.S.C. 154(b) by 770 days.

(21) Appl. No.: 13/502,139

(22) PCT Filed: Oct. 8, 2010

(86) PCT No.: PCT/CN2010/077600
§ 371 (c)(1),
(2), (4) Date: Apr. 15, 2012

(87) PCT Pub. No.: WO2011/044826
PCT Pub. Date: Apr. 21, 2011

(65) Prior Publication Data
US 2012/0208667 A1    Aug. 16, 2012

(30) Foreign Application Priority Data

Oct. 16, 2009    (CN) .......................... 2009 1 0206282

(51) Int. Cl.
| | | |
|---|---|---|
| F16H 61/68 | (2006.01) |
| F16D 31/04 | (2006.01) |
| F04C 14/24 | (2006.01) |
| F16D 31/06 | (2006.01) |
| F16D 31/08 | (2006.01) |
| F16H 3/72 | (2006.01) |
| F04C 2/10 | (2006.01) |
| F04C 2/344 | (2006.01) |

(52) U.S. Cl.
CPC ................. *F16D 31/04* (2013.01); *F04C 14/24* (2013.01); *F16D 31/06* (2013.01); *F16D 31/08* (2013.01); *F16H 3/722* (2013.01); *F04C 2/10* (2013.01); *F04C 2/344* (2013.01); *Y10T 74/20024* (2015.01)

(58) Field of Classification Search
CPC ....................................................... F16H 3/722
See application file for complete search history.

(56) References Cited

FOREIGN PATENT DOCUMENTS

CN        1342569 A  *  4/2002

* cited by examiner

*Primary Examiner* — Derek D Knight

(57) ABSTRACT

A speed changing mechanism includes a pump (1) including a liquid suction channel (6), a liquid drainage channel (8) and working components (3, 4) moving relatively to each other forming working volumes. A relative movement of the working component leads to a periodic increase and decrease of the working volume, so that the fluid is sucked through the liquid suction channel and discharged through the liquid drainage channel, and the pressure energy discharging the fluid is increased by the excursion of the working components. A part of working components is connected to an input component, another part of working components are connected to an output component. The movement of the part of working components relative to another part of working components is changed by changing the flow rate of the pump. Therefore, the speed changing mechanism can realize the switch-on/off of power transmission and change the transmitted power.

6 Claims, 7 Drawing Sheets

SPEED CHANGING CONTROL METHOD AND SPEED CHANGING MECHANISM THEREOF

BACKGROUND OF THE PRESENT INVENTION

1. Field of Invention

The present invention relates to a speed changing mechanism and a speed changing control method thereof, and more particularly to a stepped automatic speed changing mechanism.

2. Description of Related Arts

Automatic transmission is an important component of the development and application of automobiles, which not only provides convenience for the driver, but also provides excellent comfort for the passenger. Furthermore, it can protect the power components of the vehicle, thereby prolonging the service life. The application of the automatic transmission can greatly simplify the driving operation, so the automatic transmission is the key component for the automobile commonly used.

After a hundred years of development, people invent the AT (hydraulic automatic transmission), and CVT (transmission ratio continuously variable transmission) and AMT (automatic mechanical transmission) in the automobile industry. In recent years, due to the influence of the energy problem, the hydraulic torque converter used by the AT has the low transmission efficiency, which seriously affects the development of AT. Therefore, CVT and AMT are developed instead of AT.

Due to the friction drive, the transfer torque and the durability of CVT are the biggest application barrier. Currently, CVT are mainly applied to the small displacement volume passenger vehicles. In spite that CVT are applied to the few high-grade large displacement volume vehicles, the market feeds back that CVT has a lot of problems, thereby some famous automobile manufacturers no longer continue to use CVT.

AMT has simple structure, low cost and high transmission efficiency, but it takes a long time to interrupt power transfer during the shifting process, thereby resulting in poor comfort. In order to solve the power interrupt problem, DCT (double clutch transmission), using two clutches to support the odd shifting and the even shifting, respectively, is invented. The shifting process is a process in which two clutches are switched, and has fast speed, thereby solving the inherent defects of AMT, and achieving the high-efficient transmission. However, DCT has complex structure and high cost. Simultaneously, it is difficult for DCT to control the friction clutch.

All transmissions mentioned above have the short-time power interruption during the shifting process except CVT for avoiding the transmission interference and protecting the shift conversion components. Therefore, it is desired for people to invent an automatic transmission with the high transmission efficiency, simple structure, low cost and capability of shifting without power interruption.

SUMMARY OF THE PRESENT INVENTION

An object of the present invention is to provide a speed changing control method, which is simple, easy to control and capable of achieving the switch-on/off of the power transmission and changing the power transmission without power interruption.

The speed changing control method comprises a pump which comprises a liquid suction channel, a liquid drainage channel, and working components which move relatively to each other forming a plurality of working volumes, wherein the relative movement of the working components leads to a periodic increase and decrease of the working volume, so that the fluid is sucked through the liquid suction channel and is discharged through the liquid drainage channel, and the pressure energy discharging the fluid is increased by the excursion of the working components. The speed changing control method is characterized in that a part of working components are connected to an input component, another part of working components are connected to an output component, and the movement of the part of working components relative to another part of working components is changed by changing the flow rate of the pump.

The present invention also provides a speed changing mechanism which has small size and simple operation, is easy to control, and is capable of achieving the switch-on/off of the power transmission and changing the power transmission without power interruption.

The speed changing mechanism comprises at least a pump which comprises a liquid suction channel, a liquid drainage channel, and working components which move relatively to each other forming a plurality of working volumes, wherein the relative movement of the working components leads to a periodic increase and decrease of the working volume, so that the fluid is sucked through the liquid suction channel and is discharged through the liquid drainage channel, and the pressure energy discharging the fluid is increased by the excursion of the working components. The speed changing mechanism is characterized in that a part of working components of the pump is connected to an input component, another part of working components of the pump is connected to an output component. The speed changing mechanism further comprises a flow control device disposed at the liquid suction channel or/and the liquid drainage channel.

As the improvement of the speed changing mechanism mentioned above, the pump is a gear pump, the working components comprise a pump body, a center gear and a planetary gear engaged with the center gear, wherein the center gear is rotatablely disposed on the pump body, the planetary gear is rotatablely connected with a planetary gear shaft, the planetary gear shaft is supported on the pump body, one of the center gear and the pump body is connected with the input component, and the other of the center gear and the pump body is connected with the output component.

Preferably, the speed changing mechanism comprises two gear pumps, the output component is an output shaft, the output shaft passes through the center gear and the pump body of the two pumps, the input component comprises an input shaft, two transmission components, and two transmission gears rotatablely connected with the output shaft, wherein the two transmission gears are connected with the input shaft by the two transmission components, respectively. The two transmission components have different transmission ratio. For the center gear and the pump body of one of the pumps, the center gear is rotatablely connected with the output shaft and fastenedly connected with a transmission gear, the output shaft is fastenedly connected with the pump body at a circumferential direction, or, the pump body is rotatablely connected with the output shaft and fastenedly connected with a transmission gear, the output shaft is fastenedly connected with the center gear at a circumferential direction.

An oil ring is provided at a peripheral edge of the pump body of the gear pump. The oil ring is rotatablely connected with the pump body. An annular liquid inlet passage and an annular liquid outlet passage are provided at an inner peripheral surface of the oil ring. The liquid suction channel and the liquid drainage channel disposed on the pump body are communicated with the annular liquid inlet passage and annular liquid outlet passage, respectively. The liquid inlet pathway and the liquid outlet pathway communicating with the annular liquid inlet passage and the annular liquid outlet passage are provided on the oil ring. Two flow control devices are provided at the liquid inlet pathway and the liquid outlet pathway, respectively. Preferably, the speed changing mechanism further comprises a one-way valve connected with the flow control device in parallel, provided at the liquid inlet pathway and the liquid outlet pathway, which only allows the fluid to flow into the pump.

The pump body comprises at least two planetary gears which are evenly distributed at a peripheral edge of the center gear.

As the improvement of the speed changing mechanism mentioned above, the pump is a vane pump. The working components comprise a stator, a rotor and a plurality of blades disposed on the rotor. One of the rotor shaft and the stator is connected to the input component, the other of the rotor shaft and the stator is connected to the output component. For example, the stator is the pump body, the rotor shaft is connected with the input shaft as the input component, and the pump body is connected with the output gear as the output component.

As the improvement of the speed changing mechanism mentioned above, the pump is a gear pump, the working components comprise a pump body, a center gear and a planetary gear engaged with the center gear, wherein a center gear shaft is connected with the input component which drives the center gear shaft to rotate, the planetary gear shaft is supported on the pump body and disposed on the end surface of the output gear as the output component, and the output gear is rotatably connected with the rotation shaft which is coaxially aligned with the center gear.

As the improvement of the speed changing mechanism mentioned above, the pump is a rotor pump. The working components comprise a pump body, an outer rotor, an inner rotor disposed within the outer rotor. One of the inner rotor shaft and the pump body is connected with the input component. The other of the inner rotor shaft and the pump body is connected with the output component. For example, the inner rotor shaft is connected with the input shaft as the input component, and the pump body is connected with the output gear as the output component.

As the improvement of the speed changing mechanism mentioned above, an oil ring is provided at a peripheral edge of the pump body of the pump. The oil ring is rotatably connected with the pump. An annular liquid inlet passage and an annular liquid outlet passage are provided at an inner peripheral surface of the oil ring. The liquid suction channel and the liquid drainage channel of the pump are communicated with the annular liquid inlet passage and the annular liquid outlet passage, respectively. The liquid inlet pathway and the liquid outlet pathway communicating with the annular liquid inlet passage and the annular liquid outlet passage are provided on the oil ring. Two flow control devices are provided at the liquid inlet pathway and the liquid outlet pathway, respectively. Preferably, the speed changing mechanism further comprises a one-way valve connected with the flow control device in parallel, provided at the liquid inlet pathway and the liquid outlet pathway, which only allows the fluid to flow into the pump.

The speed changing control method or the speed changing mechanism of the present invention is completely different from the prior art. The working principle of the present invention is described as follows.

The pump is an existing product and has the liquid suction channel, the liquid drainage channel and the working components moving relatively to each other. The working components of the pump form the working volume. The relative movement of the working components leads to a periodic increase and decrease of the working volume, so that the fluid (liquid or gas) is sucked through the liquid suction channel and is discharged through the liquid drainage channel, and the pressure energy discharging the fluid is increased by the excursion of the working components.

For example, the outer-engaged gear pump is mainly made up of a pair of engaged gears (the center gear and the planetary gear) installed within the casing. A cover is provided at two sides of the gear. The casing, the cover and every slot between gear teeth form a plurality of sealing working chambers (i.e. working volumes). When the gear rotates, the engaged gear teeth are gradually disengaged from each other, the sealing working chamber is gradually increased, so that the oil suction chamber, provided at a side of the two gears, forms the partial vacuum. Therefore, under the effect of the external atmospheric pressure, the oil enters into the oil suction chamber via the liquid suction channel, so that the slots between the gear teeth are filled up and the oil is brought into the oil pressure chamber provided at the other side of the two gears with the rotation of the gear. At the oil pressure region, the gear teeth gradually begin to engage with each other, the volume of the sealing working chamber is gradually decreased, and the oil is excluded and sent to the liquid drainage channel (pressure pipeline) from the oil pressure chamber. The casing, the cover, the center gear and the planetary gear are main working components of the gear pump.

For example, the vane pump comprises a pump body, a stator (inner cavity molded line), a rotor, a plurality of blades and an oil distribution disk. The stator is generally the inner cavity molded line of the pump body. A plurality of blades slots are provided at a peripheral edge of the rotor. The blades are provided within the rotor. The oil distribution disk is provided at two sides of the stator and the rotor. The liquid suction channel and the liquid drainage channel are provided at the oil distribution disk. A plurality of working chambers (i.e. working volumes) are formed among the stator, the rotor, the blades and the oil distribution disk. When the rotor rotates within the stator, under the effect of the centrifugal force and hydraulic pressure, the outer end of the blade is against the inner wall of the stator, and the blade slides back and forth within the blade slot. When the blade moves from the short radius to the long radius, the working volume among the blades is increased, the pressure is decreased, the oil is sucked via the liquid suction channel of the oil distribution disk. When the blade moves from the long radius to the short radius, the working volume among the blades is decreased, the oil is discharged via the liquid drainage channel of the oil distribution disk. The pump body, the stator, the rotor, the oil distribution disk and the blades are working components of the vane pump.

For example, the rotor pump comprises a pump body, an outer rotor, and an inner rotor disposed within the outer rotor. An inner rotor shaft drives the inner rotor to rotate, and the inner rotor drives the outer rotor to rotate. The tooth profile of every tooth of the inner rotor always keeps the point contact with the tooth profile of every tooth of the outer rotor, so that four working chambers (i.e. working volumes) are formed among the inner and outer rotors and the pump body. When a working chamber rotates to the liquid suction channel, the volume is increased, the vacuum is produced, and the fluid is sucked into the working chamber via the liquid suction channel. With the continuous rotation of the inner and outer rotors, when the working chamber rotates to a position which is communicated with the liquid drainage channel, the volume is decreased, and the hydraulic pressure is increased, thereby the liquid is pressed into the liquid drainage channel. The pump body, the outer rotor, and the inner rotor are working components of the rotor pump.

It is known that the fluid has the incompressibility. If a part of working components is connected to the transmission input component, another part of working components is connected to the transmission output component, and then the relative movement of the input component to the output component can be changed by changing the flow rate of the pump. For example, when the flow rate of the liquid drainage channel is zero (the liquid drainage channel is completely blocked), the pump can not discharge the oil, the working volume of the pump can not be changed, so that the working components can not move relatively to each other. Accordingly, the input component can not move relatively to the output component, which results in achieving the complete power transmission from the input component to the output component.

When the liquid drainage channel is completely open, the flow rate of the liquid drainage channel is not limited, the pump can freely discharge oil, the working volume of the pump is constantly changed for sucking or discharging oil. The working components can freely move relatively to each other. The input components can freely move relatively to the output components, which results in achieving the unpowered transmission from the input component to the output component.

When the liquid drainage channel is in the intermediate state of the complete plugging and the fully open, the liquid drainage channel has a certain flow rate. Meanwhile, the oil can not successfully pass through the pump, a certain pressure is produced within the pump, thereby a force is produced between the working components, namely, a force is produced between the input component and the output component. Therefore, a certain power transmission is produced between the input component and the output component. The smaller the flow rate of the liquid drainage channel, the greater the power transmission, which is the partially power transmission mode.

The movement and power transmission of the input component and the output component can be changed by controlling the flow rate of the pump, the present invention is easy to implement and control, adapted for any mechanical transmission speed changing mechanisms and clutch mechanisms, for example, vehicle speed changing mechanisms and machine speed changing mechanisms. The present invention can achieve the power switch-on/off in any case without synchronizer, clutch and other auxiliary mechanisms, thereby the power interruption and high power consumption during the transmission control are solved. The switch-on/off is rapid and smooth, and the friction material is not completely used for protecting the environment.

DETAILED DESCRIPTION OF THE PREFERRED EMBODIMENT

EXAMPLE 1

Figure 1:
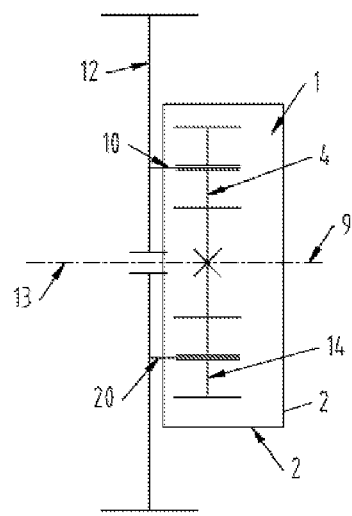
FIG. 1 is a perspective view of a speed changing mechanism according to a first preferred embodiment of the present invention.
Figure 2:
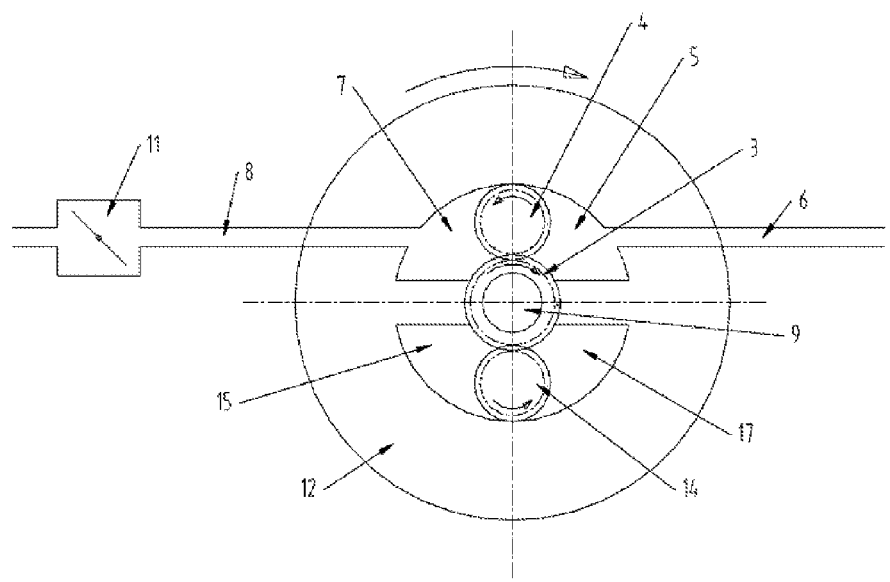
FIG. 2 is a right view of FIG. 1.

A speed changing mechanism, as shown in FIG. 1, comprises an outer-engaged gear pump 1 which comprises two pairs of engaged gears installed within a casing 2. A center gear 3 is engaged with a first planetary gear 4 and a second planetary gear 14, respectively. A cover fastened to the casing is provided at two sides of the gears. The casing, the cover and every slot between the gear teeth form a plurality of sealing working chambers (i.e. working volumes). When the gears rotate along the direction as shown in FIG. 2, the engaged gear teeth of the center gear 3 and the first planetary gear 4 are gradually disengaged from each other, the sealing working volume is gradually increased, so that an oil suction chamber 5, provided at a right side of the center gear 3 and the first planetary gear 4, forms the partial vacuum. Therefore, under the effect of the external atmospheric pressure, the oil (or other fluids) enters into the oil suction chamber via a liquid suction channel 6, so that the slots between the gear teeth are filled up and the oil is brought into an oil pressure chamber 7 provided at a left side of the center gear 3 and the first planetary gear 4 with the rotation of the gears. At the oil pressure region, the gear teeth gradually begin to engage with each other, the volume of the sealing working chamber is gradually decreased, the oil is excluded and sent to a liquid drainage channel (pressure pipeline) 8 from the oil pressure chamber. The engaged gear teeth of the center gear 3 and the second planetary gear 14 are gradually disengaged from each other, the sealing working volume is gradually increased, so that an oil suction chamber 15, provided at a left side of the center gear 3 and the second planetary gear 14, forms the partial vacuum. Therefore, under the effect of the external atmospheric pressure, the oil enters into the oil suction chamber via a liquid suction channel (which is not shown), so that the slots between the gear teeth are filled up and the oil is brought into an oil pressure chamber 17 provided at another side of the center gear 3 and the second planetary gear 14 with the rotation of the gears. At the oil pressure region, the gear teeth gradually begin to engage with each other, the volume of the sealing working chamber gradually is decreased, the oil is excluded and sent to a liquid drainage channel (pressure pipeline which is not shown) from the oil pressure chamber.

A casing, a cover, a center gear, a first planetary gear and a second planetary gear are main working components of the gear pump.

A center gear shaft 9 is connected with an input component (not shown) which drives the center gear shaft to rotate. An output gear 12 as an output component is rotatablely (sleevedly) connected with a rotating shaft 13. The rotating shaft 13 is coaxially aligned with the center gear shaft 9. An extension end of a first planetary gear shaft 10 and a second planetary gear shaft 20 extending from the cover is connected with an end surface of the output gear 12.

A flow valve 11 is provided at the liquid drainage channel 8.

When the flow rate of the flow valve 11 is zero (namely, the liquid drainage channel is completely blocked), the pump can not discharge oil, the working volume of the pump can not be changed, so that the center gear can not move relatively to the first planetary gear (of course, the center gear also can not move relatively to the second planetary gear). Therefore, the input component can not move relatively to the output component, which results in achieving the full power transmission from the input component to the output component.

When the liquid drainage channel is completely open, the flow rate of the liquid drainage channel is not limited, the pump can freely discharge oil without obstacle, the working volume of the pump is constantly changed for sucking or discharging oil. Accordingly, the center gear can freely move relatively to the first planetary gear and the second planetary gear. Therefore, the input component can freely move relatively to the output component, which results in achieving the unpowered transmission from the input component to the output component.

When the liquid drainage channel is in the intermediate state of the complete plugging and the fully open, the liquid drainage channel has a certain flow rate. Meanwhile, the oil can not successfully pass through the pump, a certain pressure is produced within the pump, thereby a force is produced between the center gear and the first planetary gear, namely, a force is produced between the input component and the output component. Therefore, a certain power transmission is produced between the input component and the output component. The smaller the flow rate of the liquid drainage channel, the greater the power transmission, which is the partially power transmission mode.

EXAMPLE 2

Figure 3:
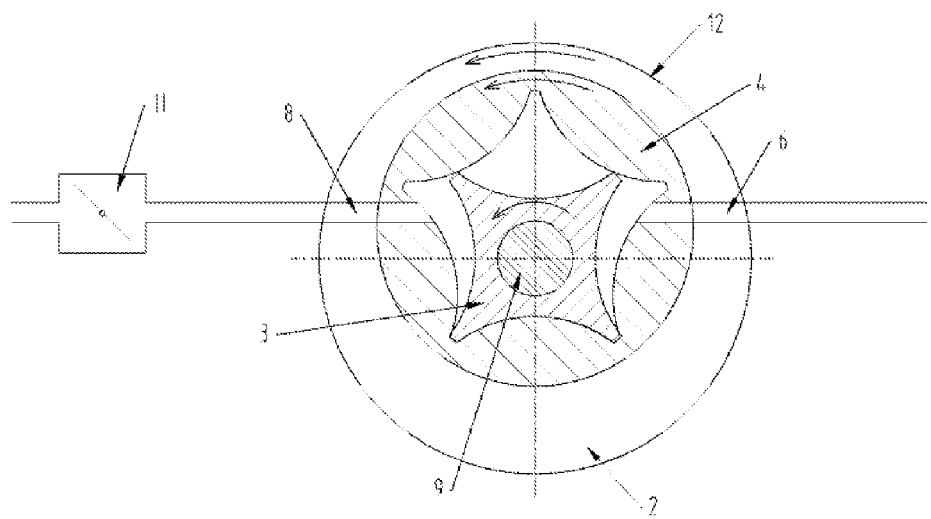
FIG. 3 is a perspective view of a speed changing mechanism according to a second preferred embodiment of the present invention.

Referring to FIG. 3, a speed changing mechanism comprises a rotor pump which comprises a pump body 2, an outer rotor 4, an inner rotor 3 disposed within the outer rotor. An inner rotor shaft 9 drives the inner rotor 3 to rotate, and the inner rotor drives the outer rotor to rotate. The tooth profile of every tooth of the inner rotor always keeps the point contact with the tooth profile of every tooth of the outer rotor, so that four working chambers (i.e. working volumes) are formed among the inner and outer rotors and the pump body. The inner and outer rotors rotate along the direction of the arrow shown in FIG. 3, when a working chamber rotates to the liquid suction channel 6, the volume is increased, and the vacuum is produced, thereby the liquid is sucked into the working chamber from the liquid suction channel. With the continuous rotation of the inner and outer rotors, when the working chamber rotates to a position which is communicated with the liquid drainage channel 8, the volume is decreased, and the hydraulic pressure is increased, thereby the liquid is pressed into the liquid drainage channel 8. The pump body 2, the outer rotor 4, and the inner rotor 3 are main working components of the rotor pump. A flow valve 11 is provided at the liquid drainage channel 8. The inner rotor shaft is connected with an input shaft (not shown) which acts as an input component and drives the inner rotor shaft to rotate. The pump body 2 and the output gear 12 as the output component are a whole (the gear teeth are provided at a peripheral edge of the pump body 2, thereby forming the output gear 12).

When the flow rate of the flow valve 11 is zero (namely, the liquid drainage channel is completely blocked), the rotor pump can not discharge oil, and the working volume of the rotor pump can not be changed, so that the outer rotor, the inner rotor and the pump body can not move relatively to each other. Therefore, the input shaft connected with the inner rotor shaft can not move relatively to the output gear 12, which results in achieving the full power transmission from the input shaft to the output gear.

When the liquid drainage channel is completely open (the flow valve 11 is completely open), the flow rate of the liquid drainage channel is not limited, the rotor pump can freely discharge oil (or other fluids) without obstacle, the working volume of the rotor pump is constantly changed for sucking or discharging oil. Therefore, the outer rotor, the inner rotor and the pump body can freely move relatively to each other, and the input shaft can freely move relatively to the output gear, which results in achieving the unpowered transmission from the input component to the output component.

When the liquid drainage channel is in the intermediate state of the complete plugging and the fully open, the liquid drainage channel has a certain flow rate. Meanwhile, the oil can not successfully pass through the pump, a certain pressure is produced within the pump, thereby a force is produced among the inner rotor shaft, the pump body and the outer rotor, namely, a force is produced between the input component and the output component. Therefore, a certain power transmission is produced between the input component and the output component. The smaller the flow rate of the liquid drainage channel, the greater the power transmission, which is the partially power transmission mode.

Therefore, the power transmission between the input shaft and the output gear can be controlled by controlling the flow valve.

EXAMPLE 3

Figure 4:
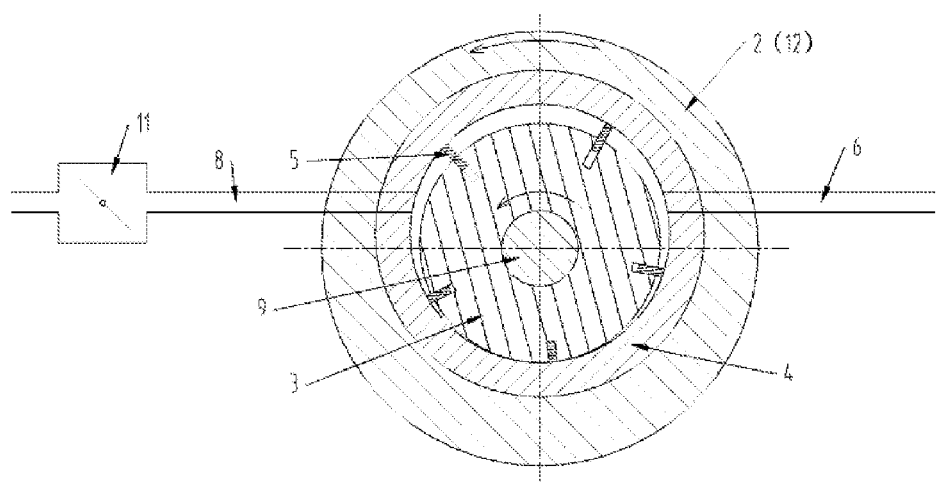
FIG. 4 is a perspective view of a speed changing mechanism according to a third preferred embodiment of the present invention.
Figure 5:
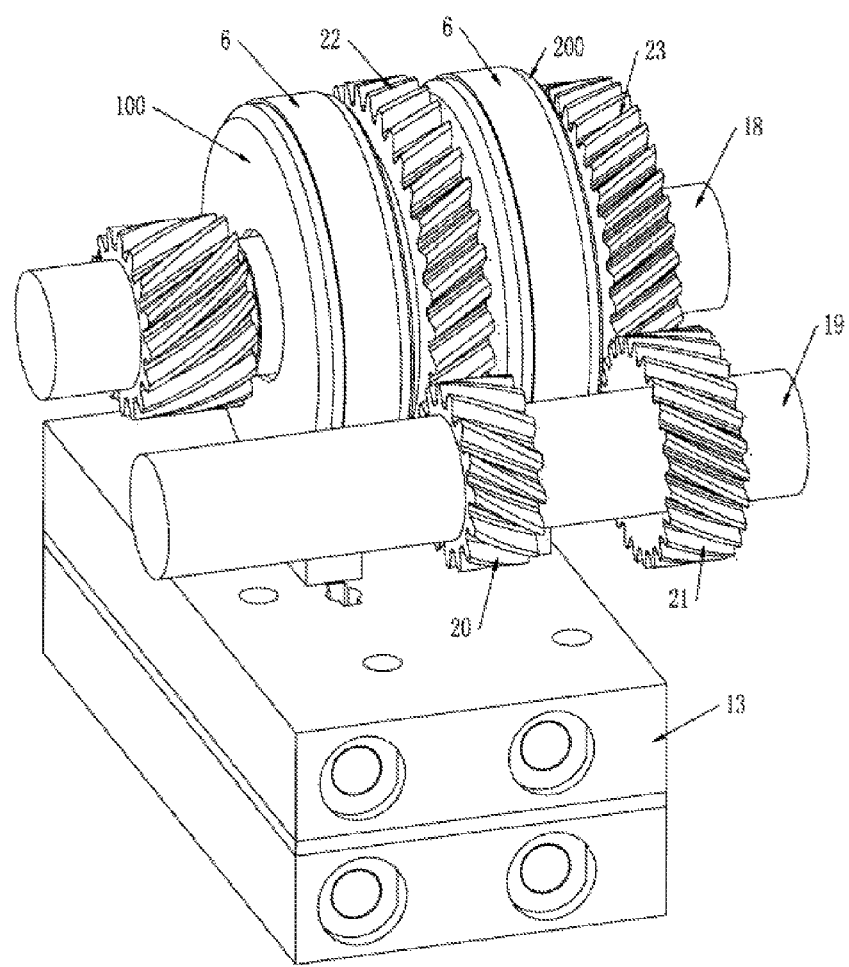
FIG. 5 is a top view of a transmission according to a fourth preferred embodiment of the present invention.
Figure 6:
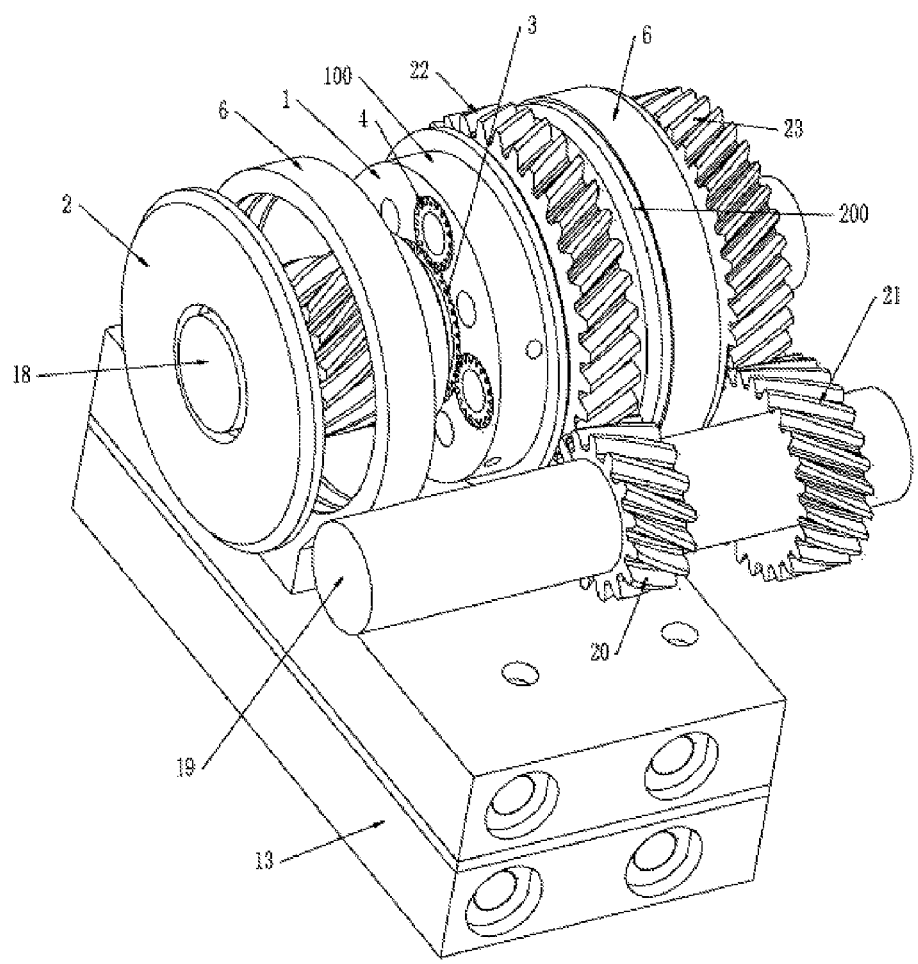
FIG. 6 is an exploded diagram of FIG. 5.

Referring to FIG. 4, a speed changing mechanism comprises a vane pump which comprises a pump body 2, a stator 4 fastened to the pump body, a rotor 3, a plurality of blades 5 and an oil distribution disk. A plurality of blades slots are provided at a peripheral edge of the rotor 3. The blades 5 are provided within the blade slots. The oil distribution disk is provided at two sides of the stator and the rotor. The liquid suction channel 6 and the liquid drainage channel 8 are provided at the oil distribution disk. A plurality of working chambers (i.e. working volumes) are formed among the stator, the rotor, the blades and the oil distribution disk. When the rotor shaft 9 drives the rotor to rotate within the stator, under the effect of the centrifugal force and hydraulic pressure, the outer end of each of the blades is against an inner wall of the stator, and each of the blades slides back and forth within the corresponding blade slot. When each of the blades moves from the short radius to the long radius, the working volume among the blades is increased, the pressure is decreased, so that the oil is sucked via the liquid suction channel of the oil distribution disk. When each of the blades moves from the long radius to the short radius, the working volume among the blades is decreased, so that the oil is discharged via the liquid drainage channel of the oil distribution disk. The pump body, the stator, the rotor, the oil distribution disk and the blades are main working components of the vane pump. A flow valve 11 is provided at the liquid drainage channel 8. The rotor shaft is connected with the input shaft as the input component (not shown). The pump body 2 and the output gear 12 as the output component are a whole (the gear teeth are provided at a peripheral edge of the pump body 2, thereby forming the output gear 12).

When the flow rate of the flow valve 11 is zero (namely, the liquid drainage channel is completely blocked), the vane pump can not discharge oil (or other fluids), and the working volume of the vane pump can not be changed, so that the stator, the rotor and the blade can not move relatively to each other. Therefore, the input shaft connected with the rotor shaft 9 can not move relatively to the output gear 12, which results in achieving the full power transmission from the input shaft to the output gear.

When the liquid drainage channel is completely open (the flow valve 11 is completely open), the flow rate of the drainage channel is not limited, the vane pump can freely discharge oil without obstacle, the working volume of the vane pump is constantly changed for sucking or discharging oil. Therefore, the stator, the rotor and the blades can freely move relatively to each other, and the input shaft can freely move relatively to the output gear, which results in achieving the unpowered transmission from the input component to the output component.

When the liquid drainage channel is in the intermediate state of the complete plugging and the fully open, the liquid drainage channel has a certain flow rate. Meanwhile, the oil can not successfully pass through the pump, a certain pressure is produced within the pump, thereby a force is produced among the stator, the blades, the rotor and the oil distribution disk, namely, a force is produced between the input component and the output component. Therefore, a certain power transmission is produced between the input component and the output component. The smaller the flow rate of the liquid drainage channel, the greater the power transmission, which is the partially power transmission mode.

Therefore, the power transmission between the input shaft and the output gear can be controlled by controlling the flow valve.

EXAMPLE 4

Referring to FIGS. 5-9, a pump-type stepped automatic transmission comprises two gear pumps 100 and 200. Every gear pump comprises a pump body consisting of a pump casing 1 and a cover 2, a central gear 3 and four planetary gears 4. A center of the pump casing has a center gear cavity for disposing the center gear 3. The center gear 3 can rotate relatively to the pump body (the pump casing and the cover). The four planetary gears 4 are evenly distributed at a peripheral edge of the center gear 3 which is engaged with the four planetary gears 4. The four planetary gears are disposed within the planetary gear cavity which is provided at the pump casing. The planetary gears 4 are rotatablely connected with the planetary gear shaft 5 (the planetary gears 4 can rotate relatively to the planetary gear shaft). One end of the planetary gear shaft 5 is supported on the cover 2, and the other end of the planetary gear shaft 5 is supported on a side wall of the pump casing.

An oil ring 6, which is capable of rotate relatively to the pump casing of every gear pump, is provided at a peripheral edge of the pump casing of every gear pump. An inner peripheral surface of the oil ring has an annular liquid inlet passage 7 and an annular liquid outlet passage 8. The pump casing has four liquid suction channels 9 and four liquid drainage channels 10 which are basically extended along the radial direction of the pump casing. The inner port of each of the liquid suction channels and the inner port of each of the liquid drainage channels are communicated with two sides of the engaging portion of the center gear and the planetary gear, respectively. The inner port of each of the liquid suction channels and the inner port of each of the liquid drainage channels are communicated with the annular liquid inlet passage and the annular liquid outlet passage, respectively. Two oil rings 6 are fastened to the pump casing of the hydraulic pressure control valve component 13. The liquid inlet pathway 11 and the liquid outlet pathway 12 disposed within the hydraulic pressure control valve component 13 and the oil rings 6 are communicated with the annular liquid inlet passage 7 and the annular liquid outlet passage 8. The hydraulic pressure control valve component 13 comprises a flow control device and a one-way valve. The flow control device (i.e., throttle valve) 14 and the one-way valve 15 are disposed at the liquid inlet pathway 11 in parallel. The flow control device 16 and the one-way valve 17 are disposed at the liquid outlet pathway 12 in parallel. The one-way valves 15 and 17 only allow the fluid to flow into the pump.

The output component is the output shaft 18 which passes through the center gear 3, the pump casing and the cover of the two pumps. The input component comprises the input shaft 19, the first stepped driving gear 20 and the second stepped driving gear 21 which are fastened to the input shaft, the first stepped driven gear (transmission gear) 22 and the second stepped driven gear (transmission gear) 23 rotatablely connected with the output shaft (the first stepped driven gear 22 and the second stepped driven gear 23 can rotate relatively to the output shaft). The first stepped driving gear 20 is engaged with the first stepped driven gear 22, which results in forming a gear transmission mechanism 24. The second stepped driving gear 21 is engaged with the second stepped driven gear 23, which results in forming another gear transmission mechanism 25. The transmission ratio of the gear transmission mechanism 24 is larger than that of the gear transmission mechanism 25.

Figure 10:
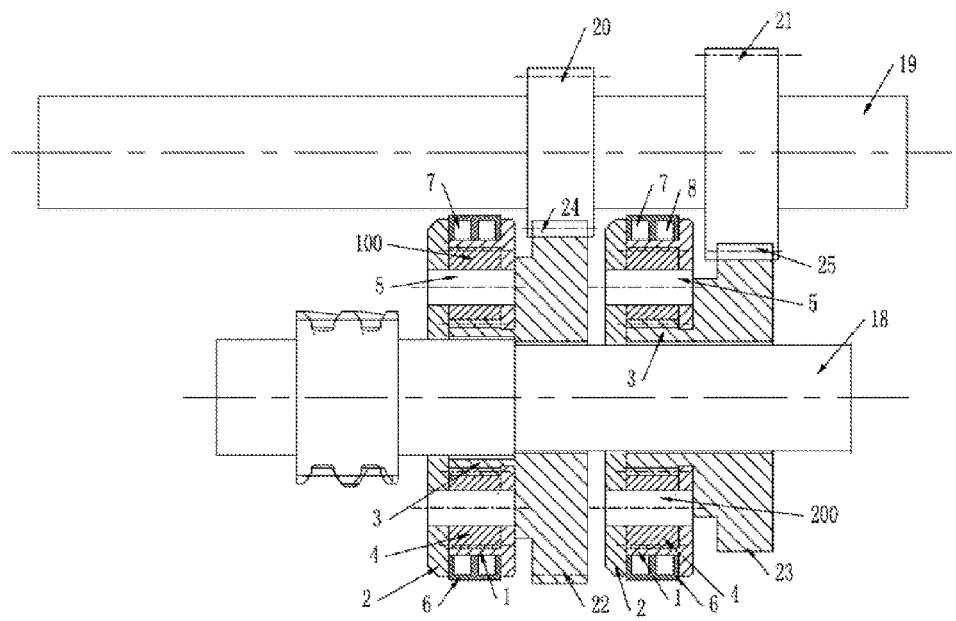
FIG. 10 shows another connection relationship among the input shaft, the gear pump and the output shaft according to the fourth preferred embodiment of the present invention.

Referring to FIG. 10, the connection relationship among the input shaft, the gear pump and the output shaft is described as follows. The center gears 3 of the two gear pumps are rotatablely connected with the output shaft 18 (the center gears 3 can rotate relatively to the output shaft 18), and fixedly connected with the first stepped driven gear 22 and the second stepped driven gear 23, respectively. The output shaft 18 is fixedly connected with the cover 2 of the two gear pumps at a peripheral edge (i.e., which is connected via the spline).

Figure 7:
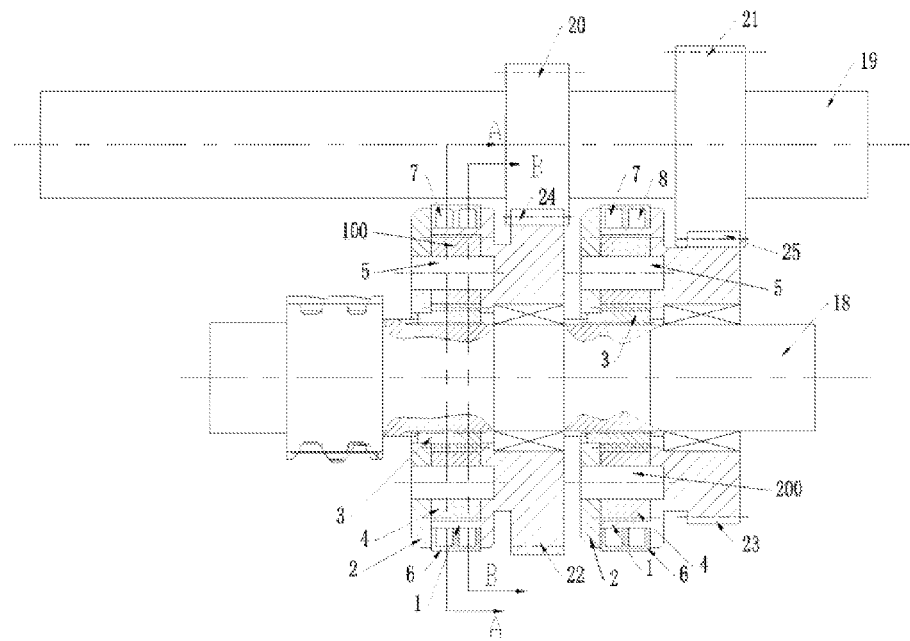
FIG. 7 shows the connection relationship among the input shaft, the gear pump and the output shaft according to the fourth preferred embodiment of the present invention.
Figures 8, 9:
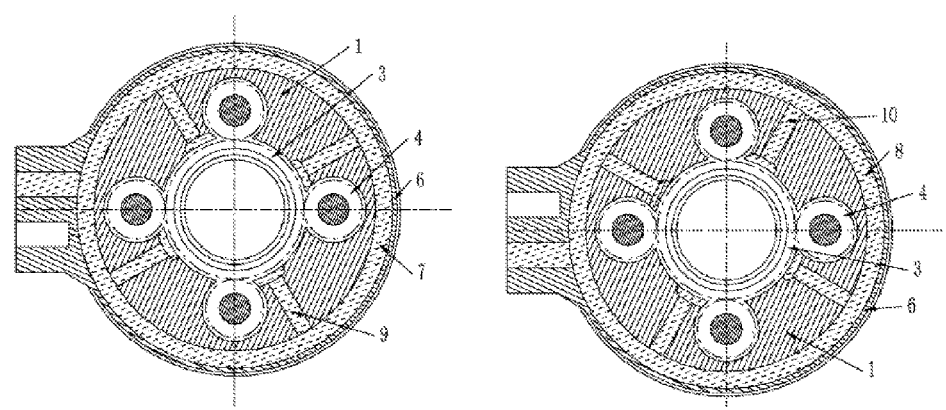
FIG. 8 is a sectional view of FIG. 7 along the A-A direction.
FIG. 9 is a sectional view of FIG. 7 along the B-B direction.

Of course, referring to FIG. 7, the connection relationship among the input shaft, the gear pump and the output shaft also can be described as follows. The pump bodies (the pump casing 1 and the cover 2) of the two gear pumps are rotatablely connected with the output shaft 18 (the pump bodies can rotate relatively to the output shaft 18), and fixedly connected with the first stepped driven gear 22 and the second stepped driven gear 23, respectively. The output shaft 18 is fixedly connected with the center gears 3 of the two gear pumps at a peripheral edge (i.e., which is connected via the spline).

The connection relationship among the input shaft, the gear pump and the output shaft also can be described as follows. The pump body (the pump casing 1 and the cover 2) of the gear pump 100 is rotatablely connected with the output shaft 18 (the pump body can rotate relatively to the output shaft 18), and fixedly connected with the first stepped driven gear 22 (or the second stepped driven gear 23). The output shaft 18 is fixedly connected with the center gear 3 of the gear pump 100 at a peripheral edge (i.e., which is connected via the spline). The center gear 3 of the gear pump 200 is rotatablely connected with the output shaft 18 (the center gear 3 can rotate relatively to the output shaft 18) and fixedly connected with the second stepped driven gear 23 (or the first stepped driven gear 22). The output shaft 18 is fixedly connected with the cover 2 of the gear pump 200 at a peripheral edge (i.e., which is connected via the spline).

In the input components mentioned above, the transmission gear is the first stepped driven gear 22 and the second stepped driven gear 23 which are connected with the input shaft 19 via the gear transmission mechanisms 24 and 25, respectively. It is worth to mention that the transmission gear is not limited to the gear, the transmission mechanism between the transmission gear and the input shaft is also not limited to the gear transmission mechanism. For example, the transmission gear can be the pulley which can be connected with the input shaft via the belt.

The pump casing, the cover, the center gear and the planetary gear engaged with the center gear are working components of the gear pump. When the flow control devices 14 and 16 are open, the center gear rotates relatively to the planetary gear, the fluid is sucked into a side of the engaging portion of the center gear and the planetary gear through the liquid inlet pathway 11, the annular liquid inlet passage 7 and the liquid suction channel 9, and then is extruded by the relatively rotated center gear and the planetary gear for forming the high-pressure fluid, and then flows out from another side of the engaging portion of the center gear and the planetary gear through the liquid drainage channel 10, the annular liquid outlet passage 8 and the liquid outlet pathway 12. Of course, when the center gear and the planetary gear rotate relatively to each other at an opposite direction, the fluid flows at an opposite direction.

Referring to FIG. 10, based on the connection relationship among the input shaft, the gear pump and the output shaft transmission, the working process of the stepped automatic transmission is described as below.

Figure 11:
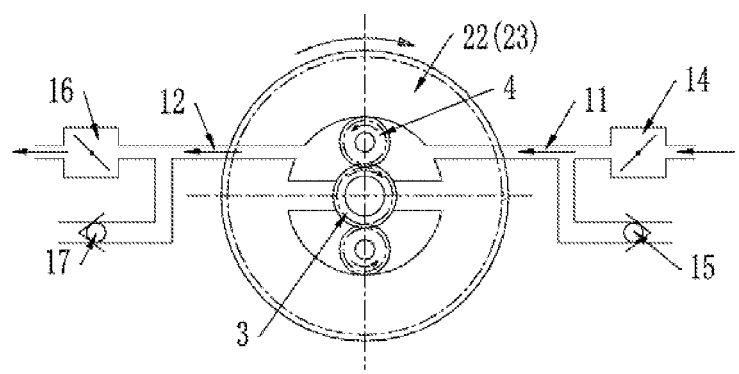
FIG. 11 is the state diagram of the flow control device of the gear pump 100 (or the gear pump 200) at the neutral position according to the fourth preferred embodiment of the present invention.

Neutral Position:

At this time, the flow control devices 14 and 16 for controlling the fluid in and out of the gear pump 100, and the flow control devices 14 and 16 for controlling the fluid in and out of the gear pump 200 are open. Referring to FIG. 11, at this time, the $1^{st}$ stepped driven gear 22 and the $2^{nd}$ stepped driven 23 are driven by the input shaft to clockwise rotate (idling) around the output shaft 18. Of course, the transmission ratio of the gear transmission mechanism 24 is larger than that of the gear transmission mechanism 25, so the rotational speed of the $1^{st}$ stepped driven gear 22 is smaller than that of the $2^{nd}$ stepped driven gear 23. The $1^{st}$ stepped driven gear 22 drives the center gear 3 of the gear pump 100 to rotate around the output shaft 18 (idling), and the $2^{nd}$ stepped driven 23 drives the center gear 3 of the gear pump 200 to rotate around the output shaft 18 (idling). If the output shaft 18 also rotates clockwise, the rotational speed thereof is smaller than that of the $1^{st}$ stepped driven gear 22. At this time, the fluid (i.e., hydraulic oil) enters into the gear pumps 100 and 200 through the flow control device 14, the liquid inlet pathway 11, the annular liquid inlet passage 7, and the liquid suction channel 9, and then forms the high-pressure fluid through the extrusion of the center gear and the planetary gear, and then flows out through the liquid drainage channel 10, the annular liquid outlet passage 8, the liquid outlet pathway 12 and the flow control device 16. Because the liquid drainage channels of the two gear pumps are completely open, when the flow rates of the liquid drainage channels are not limited, the gear pump can freely discharge oil without hindrance, the working volume is continuously changed for sucking and discharging oil, the center gear can arbitrarily move relatively to the planetary gear, and the input shaft can freely move relatively to the output shaft, thereby unpowered transmission is achieved from the input component to the output component.

Figure 12:
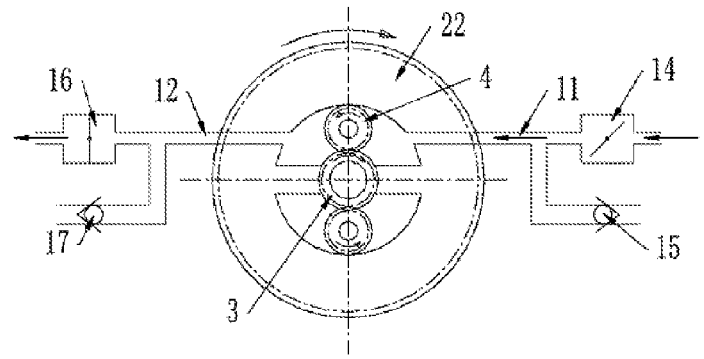
FIG. 12 is the state diagram of the flow control device of the gear pump 100 after completing the first step according to the fourth preferred embodiment of the present invention.

Linked to the First Step:

While linking to the first step, the flow control device 16 of the gear pump 100 is gradually turned off, such that the fluid discharged from the gear pump 100 is gradually decreased till it stops. Referring to FIG. 12, the center gear and the planetary gear of the gear pump 100 can not rotate relatively to each other, the pump casing and the cover of the gear pump 100 only can rotate together with the center gear, the cover of the gear pump 100 drives the output shaft to rotate, the center gear, the pump body and the output shaft clockwise rotate along the same direction for completing the link to the step, thereby the complete power transmission is achieved from the input shaft to the output shaft. At this time, the fluid within the liquid inlet pathway 11, the annular liquid inlet passage and the liquid suction channel which are communicated with the gear pump 100 is at low pressure, and the fluid within the liquid outlet pathway 12, the annular liquid outlet passage and the liquid drainage channel is at high pressure.

When the flow control device 16 is at the intermediate state of the complete blockage and the full open, the fluid discharged from the gear pump 100 has a certain flow rate. At this time, the fluid can not successfully pass through the gear pump 100, so that a certain pressure is produced within the gear pump 100, thereby producing a certain force between the center gear and the planetary gear of the gear pump 100. Therefore, a certain power transmission is provided between the input shaft and the output shaft. The smaller the flow rate of the discharged fluid, the greater the transmission power, which is the partial power transmission mode.

Shift From the $1^{st}$ Step to the $2^{nd}$ Step:

The process of linking to the $2^{nd}$ step is the same as that of linking to the $1^{st}$ step, in which all operations are adapted for the gear pump 200.

Figure 13:
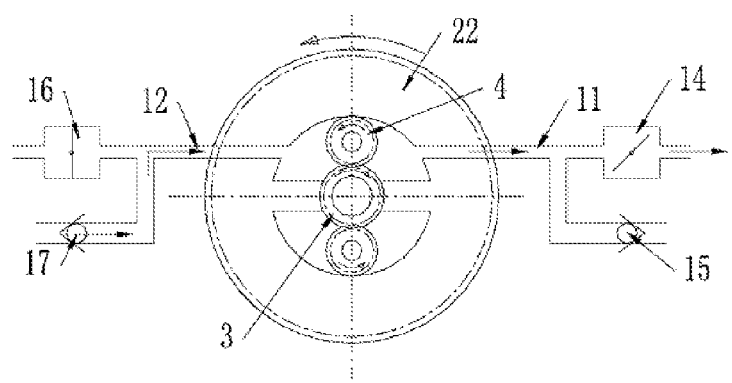
FIG. 13 is the state diagram of the flow control device of the gear pump 100 while shifting from the $1^{st}$ step to the $2^{nd}$ step according to the fourth preferred embodiment of the present invention.

It is worth to mention that the state of the gear pump 100 is changed from the $1^{st}$ step to the $2^{nd}$ step. While linking to the $2^{nd}$ step, the rotational speed of the $2^{nd}$ stepped driven gear 23 is higher than that of the $1^{st}$ stepped driven gear 22 (the transmission ratio of the gear transmission mechanism 24 is larger than that of the gear transmission mechanism 25), the output shaft 18 clockwise rotates along with the $2^{nd}$ stepped driven gear 23 after linking to the $2^{nd}$ step, and the rational speed of the output shaft 18 is higher than that of the pump body of the gear pump 100. Therefore, if the output shaft 18 is regarded as a reference, the pump body of the gear pump 100 counterclockwise rotates. At this time, referring to FIG. 13, the flow direction of the fluid within the gear pump 100 is opposite to that of the fluid while linking to the $1^{st}$ step, namely, the fluid flows into the gear pump 100 through the liquid outlet pathway 12, and then flows out through the liquid inlet pathway 11. Meanwhile, for the gear pump 100, the fluid within the liquid inlet pathway 11, the annular liquid inlet passage and the liquid suction channel which are communicated with the gear pump 100 is at high pressure, and the liquid drainage channel, the annular liquid outlet passage and the liquid outlet pathway 12 which are communicated with the gear pump 100 is at low pressure (the fluid within the liquid inlet pathway 11, the annular liquid inlet passage and the liquid suction channel which are communicated with the gear pump 200 is at low pressure, and the liquid drainage channel, the annular liquid outlet passage and the liquid outlet pathway 12 which are communicated with the gear pump 200 is at high pressure).

After linking to the $1^{st}$ step, the flow control device 14 of the gear pump 100 is open, so that while linking to the $2^{nd}$ step, the fluid can be discharged through the liquid inlet pathway 11 and then the flow control device 14. Simultaneously, after linking to the $1^{st}$ step, the flow control device 16 of the gear pump 100 is closed, and the one-way valve 17 is connected with the flow control device 16 in parallel. Therefore, while linking to the $2^{nd}$ step, referring to FIG. 13, the fluid can flow into the gear pump 100 through the one-way valve 17 and then the liquid outlet pathway 12.

As a result, the pump-type stepped automatic transmission achieves the shift without power interruption.

Figure 14:
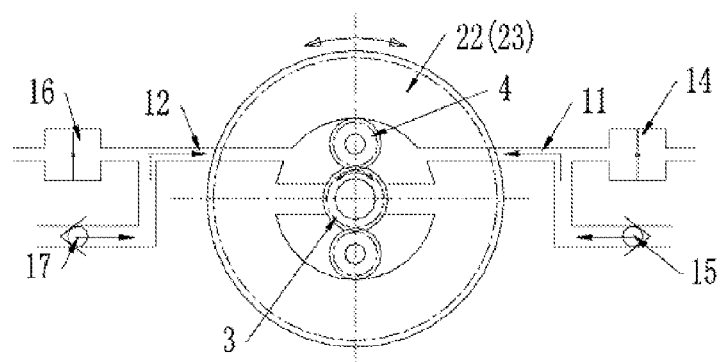
FIG. 14 is the state diagram of the flow control device of the gear pump 100 (or the gear pump 200) at the bidirectional transmission according to the fourth preferred embodiment of the present invention.

Bidirectional Transmission:

When the flow control devices 14 and 16 of the gear pump 100 (the flow control devices are disposed at the liquid outlet pathway and the liquid inlet pathway which are communicated with the gear pump 100) are closed, and the flow control devices 14 and 16 of the gear pump 200 (the flow control devices are disposed at the liquid outlet pathway and the liquid inlet pathway which are communicated with the gear pump 200) are open, referring to FIG. 14, the fluid can not flow out of the gear pump 100, the liquid inlet pathway 11 and the liquid outlet pathway 12 are at high pressure. At this time, the $1^{st}$ stepped driven gear 22 can drive the output shaft 18 to rotate clockwise and counterclockwise for achieving the bidirectional transmission. While the leakage of the pump appears, the one-way valves 15 and 17 are open for supplying the fluid to the pump.

Of course, when the flow control devices 14 and 16 of the gear pump 200 are closed, the flow control devices 14 and 16 of the gear pump 100 are open, the $2^{nd}$ stepped driven gear 23 can drive the output shaft 18 to rotate clockwise or counterclockwise for achieving the bidirectional transmission, whose principle is the same as the principle mentioned above.

The present invention adopts the pump (which can be the gear pump, the vane pump and other pump capable of changing the pressure of the fluid) to achieve the control of the power transmission, the active part (such as the pump shaft or other active parts) and the driven part (such as the pump casing or other active parts) are connected with the input component and the output component of the speed change mechanism, respectively (of course, the active part and the driven part can connected with the output and input components of the speed change mechanism), the pump rotates together with the input or output component. By the solenoid valve and other components which can control the flow rate of the fluid, the flow rate of the fluid in and out of the pump (the out flow rate can be separately controlled, or the into flow rate be separately controlled, or the into and out flow rate can be simultaneously controlled), thereby the power transmission between the input component and the output component can be controlled.

What is claimed is:

1. A speed changing mechanism, comprising a pump comprising a liquid suction channel, a liquid drainage channel, and working components which move relatively to each other forming a plurality of working volumes, wherein a relative movement of the working components leads to a periodic increase and decrease of the working volumes, so that a fluid is sucked through the liquid suction channel and is discharged through the liquid drainage channel, and a pressure energy discharging the fluid is increased by an excursion of the working components, wherein the speed changing mechanism is characterized in that a part of working components of pump is connected to an input component, another part of working components of pump is connected to an output component, the speed changing mechanism further comprises a flow control device disposed at the liquid suction channel or/and the liquid drainage channel;

wherein the pump is a gear pump, the working component comprises a pump body, a center gear and a planetary gear engaged with the center gear, wherein the center gear is rotatablely disposed on the pump body, the planetary gear is rotatablely connected with a planetary gear shaft, the planetary gear shaft is supported on the pump body, one of the center gear and the pump body is connected with the input component, and the other of the center gear and the pump body is connected with the output component;

wherein the speed changing mechanism comprises two gear pumps, the output component is an output shaft, the output shaft passes through the center gear and the pump body of the two pumps, the input component comprises an input shaft, two transmission components, and two transmission gears rotatablely connected with the output shaft, wherein the two transmission gears are connected with the input shaft by the two transmission components, respectively, the two transmission components have different transmission ratio, wherein for the center gear and the pump body of one of the pumps, the center gear is rotatablely connected with the output shaft and fastenedly connected with a transmission gear, the output shaft is fastenedly connected with the pump body at a circumferential direction, or, the pump body is rotatablely connected with the output shaft and fastenedly connected with a transmission gear, the output shaft is fastenedly connected with the center gear at a circumferential direction.

2. A speed changing mechanism, comprising a pump comprising a liquid suction channel, a liquid drainage channel, and working components which move relatively to each other forming a plurality of working volumes, wherein a relative movement of the working components leads to a periodic increase and decrease of the working volumes, so that a fluid is sucked through the liquid suction channel and is discharged through the liquid drainage channel, and a pressure energy discharging the fluid is increased by an excursion of the working components, wherein the speed changing mechanism is characterized in that a part of working components of pump is connected to an input component, another part of working components of pump is connected to an output component, the speed changing mechanism further comprises a flow control device disposed at the liquid suction channel or/and the liquid drainage channel;

wherein the pump is a gear pump, the working component comprises a pump body, a center gear and a planetary gear engaged with the center gear, wherein the center gear is rotatablely disposed on the pump body, the planetary gear is rotatablely connected with a planetary gear shaft, the planetary gear shaft is supported on the pump body, one of the center gear and the pump body is connected with the input component, and the other of the center gear and the pump body is connected with the output component;

wherein an oil ring is provided at a peripheral edge of the pump body of the gear pump, the oil ring is rotatablely connected with the pump body, an annular liquid inlet passage and an annular liquid outlet passage are provided at an inner peripheral surface of the oil ring, the liquid suction channel and the liquid drainage channel disposed on the pump body are communicated with the annular liquid inlet passage and the annular liquid outlet passage, respectively, the liquid inlet pathway and the liquid outlet pathway communicating with the annular liquid inlet passage and the annular liquid outlet passage are provided on the oil ring, and two flow control devices are provided at the liquid inlet pathway and the liquid outlet pathway, respectively.

3. The speed changing mechanism, as recited in claim 2, wherein the speed changing mechanism further comprises a one-way valve connected with the flow control device in parallel, provided at the liquid inlet pathway and the liquid outlet pathway, which only allows the fluid to flow into the pump.

4. The speed changing mechanism, as recited in claim 2, wherein the pump comprises at least two planetary gears which are evenly distributed at a peripheral edge of the center gear.

5. A speed changing mechanism, comprising a pump comprising a liquid suction channel, a liquid drainage channel, and working components which move relatively to each other forming a plurality of working volumes, wherein a relative movement of the working components leads to a periodic increase and decrease of the working volumes, so that a fluid is sucked through the liquid suction channel and is discharged through the liquid drainage channel, and a pressure energy discharging the fluid is increased by an excursion of the working components, wherein the speed changing mechanism is characterized in that a part of working components of pump is connected to an input component, another part of working components of pump is connected to an output component, the speed changing mechanism further comprises a flow control device disposed at the liquid suction channel or/and the liquid drainage channel;

wherein an oil ring is provided at a peripheral edge of the pump body of the pump, the oil ring is rotatablely connected with the pump, an annular liquid inlet passage and annular liquid outlet passage are provided at an inner peripheral surface of the oil ring, the liquid suction channel and the liquid drainage channel of the pump are communicated with the annular liquid inlet passage and the annular liquid outlet passage, respectively, the liquid inlet pathway and the liquid outlet pathway communicating with the annular liquid inlet passage and the annular liquid outlet passage are provided on the oil ring, and two flow control devices are provided at the liquid inlet pathway and the liquid outlet pathway, respectively.

6. The speed changing mechanism, as recited in claim 5, wherein the speed changing mechanism further comprises a one-way valve connected with the flow control device in parallel, and provided at the liquid inlet pathway and the liquid outlet pathway, which only allows the fluid to flow into the pump.

* * * * *